(12) United States Patent
Kozina et al.

(10) Patent No.: US 10,114,844 B2
(45) Date of Patent: Oct. 30, 2018

(54) READINESS CHECKER FOR CONTENT OBJECT MOVEMENT

(71) Applicant: International Business Machines Corporation, Armonk, NY (US)

(72) Inventors: Gerald E. Kozina, Cupertino, CA (US); Yongliang Li, Beijing (CN); Masoud Madani, Costa Mesa, CA (US); George F. Silva, Watsonville, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/954,704

(22) Filed: Nov. 30, 2015

(65) Prior Publication Data
US 2017/0154037 A1 Jun. 1, 2017

(51) Int. Cl.
*G06F 17/30* (2006.01)

(52) U.S. Cl.
CPC ...... *G06F 17/303* (2013.01); *G06F 17/30221* (2013.01); *G06F 17/30345* (2013.01); *G06F 17/30575* (2013.01)

(58) Field of Classification Search
CPC ......... G06F 17/30221; G06F 17/30575; G06F 17/30578; G06F 11/1448; G06F 11/1451; G06F 3/0689; G06F 3/0647; Y10S 707/99955
USPC .......................... 707/624, 634, 661, 667, 673
See application file for complete search history.

(56) References Cited

U.S. PATENT DOCUMENTS

| | | | | |
|---|---|---|---|---|
| 5,617,566 A * | 4/1997 | Malcolm | ............. | G06F 11/1451 707/662 |
| 6,581,075 B1 * | 6/2003 | Guturu | ............. | G06F 17/30578 |
| 7,565,661 B2 * | 7/2009 | Sim-Tang | ........... | G06F 11/1471 714/48 |
| 7,730,025 B1 * | 6/2010 | Rice | ......................... | G06F 8/51 707/602 |
| 7,751,628 B1 * | 7/2010 | Reisman | ............... | G11B 27/034 382/232 |
| 7,752,286 B2 * | 7/2010 | Anderson | ......... | G06F 17/30221 705/31 |
| 8,281,087 B2 * | 10/2012 | Stuart | ............... | G06F 17/30082 707/662 |

(Continued)

OTHER PUBLICATIONS

IBM, "An Efficient Scheme for Migration of in-use Objects in a Distributed System", dated Oct. 7, 2003, An IP.com Prior Art Database Technical Disclosure (http://ip.com/IPCOM/000019885), Total 11 pages.

(Continued)

*Primary Examiner* — Dennis Truong
(74) *Attorney, Agent, or Firm* — Janaki K. Davda; Konrad, Raynes, Davda and Victor LLP (57) ABSTRACT

Provided are techniques for movement readiness checking. It is determined whether each content object in a set of content objects is ready for movement. For each content object in the set of content objects that is determined to be ready for movement, an associated movement readiness indicator is set to indicate that the content object is ready to be moved. Then, each content object in the set of content objects is moved that has the associated movement readiness indicator set to indicate that the content object is ready to be moved.

12 Claims, 9 Drawing Sheets

(56) References Cited

U.S. PATENT DOCUMENTS

| | | | |
|---|---|---|---|
| 8,352,946 B2* | 1/2013 | Srivatsa | G06F 9/4812 718/102 |
| 8,589,439 B2 | 11/2013 | Coldicott et al. | |
| 8,838,539 B1* | 9/2014 | Ashcraft | H04L 67/02 707/637 |
| 8,949,208 B1* | 2/2015 | Xu | G06F 3/0641 707/661 |
| 9,213,721 B1* | 12/2015 | Faibish | G06F 17/30221 |
| 2002/0163925 A1* | 11/2002 | Nakagawa | G06F 17/30575 370/428 |
| 2003/0009630 A1* | 1/2003 | Morris | G06F 12/0261 711/133 |
| 2003/0033320 A1* | 2/2003 | Houldsworth | G06F 12/0269 |
| 2003/0120625 A1* | 6/2003 | Jackson | G06F 11/1451 |
| 2005/0033720 A1* | 2/2005 | Verma | G06F 9/466 |
| 2005/0097260 A1* | 5/2005 | McGovern | G06F 3/0623 711/100 |
| 2005/0273476 A1* | 12/2005 | Wertheimer | G06F 11/1458 |
| 2008/0201542 A1* | 8/2008 | Maruyama | G06F 3/0607 711/165 |
| 2009/0204650 A1* | 8/2009 | Wong | G06F 17/30153 |
| 2009/0300081 A1* | 12/2009 | Ueoka | G06F 17/30079 |
| 2011/0071876 A1* | 3/2011 | Fong | G06Q 10/06 705/7.13 |
| 2011/0252207 A1 | 10/2011 | Janosik, Jr. et al. | |
| 2012/0005542 A1* | 1/2012 | Petersen | G06F 11/0709 714/48 |
| 2012/0027134 A1* | 2/2012 | Gladwin | H04L 1/0045 375/340 |
| 2012/0084316 A1* | 4/2012 | Koenig | G06F 17/30545 707/769 |
| 2012/0124046 A1* | 5/2012 | Provenzano | G06F 3/0605 707/737 |
| 2012/0254120 A1* | 10/2012 | Fang | G06F 17/30377 707/648 |
| 2012/0330911 A1 | 12/2012 | Gruenheid et al. | |
| 2013/0110779 A1* | 5/2013 | Taylor | G06F 17/30221 707/624 |
| 2013/0132447 A1* | 5/2013 | Maeda | G06F 17/30117 707/821 |
| 2013/0212200 A1* | 8/2013 | Dennis | H04L 51/22 709/206 |
| 2014/0122577 A1* | 5/2014 | Balasubramanian | G06F 9/5072 709/203 |
| 2014/0359053 A1 | 12/2014 | Bhattacharya et al. | |
| 2015/0212897 A1* | 7/2015 | Kottomtharayil | G06F 11/1448 714/20 |
| 2016/0092535 A1* | 3/2016 | Kuchibhotla | G06F 17/30575 707/634 |
| 2016/0328413 A1* | 11/2016 | Xie | G06F 11/1402 |
| 2017/0060431 A1* | 3/2017 | Kochunni | G06F 3/0605 |

OTHER PUBLICATIONS

"Considerations for Transitioning Content to IPv6 (RFC6589)", dated Apr. 1, 2012 and electronic publication Apr. 21, 2012, An IP.com Prior Art Database Technical Disclosure (http://ip.com/IPCOM/000216889), Total 55 pages.

Dash et al.,"Using I/O Shipping to Maximize Availability, Optimize Error Handling and Detach Policies, and Maintain High Availability and Disaster Recovery Readiness", dated Jul. 3, 2013, An IP.com Prior Art Database Technical Disclosure (http://ip.com/IPCOM/000228747), Total 12 pages.

Mell et al., "Effectively and Securely Using the Cloud Computing Paradigm", dated Oct. 7, 2009, NIST, Information Technology Laboratory, Total 80 pages.

Mell et al., "The NIST Definition of Cloud Computing" dated Sep. 2011, Computer Security Division Information Technology Laboratory National Institute of Standards and Technology, Recommendations of the National Institute of Standards and Technology, Total 7 pages.

* cited by examiner

READINESS CHECKER FOR CONTENT OBJECT MOVEMENT

FIELD

Embodiments of the invention relate to a readiness checker for content object movement, which includes migration and archiving.

BACKGROUND

In content management systems, there are different types of data that are stored. One type of data is unstructured data (e.g., text documents, Portable Data Format (PDF) files, images etc.). Such unstructured data items may be referred to as objects, content or content objects. Another type of data is metadata that describes the unstructured data (e.g., content objects).

The metadata may be classified into two categories. One category includes user attributes related to a business. Typically, these user attributes are created by the user or generated by the user's application. For example, in an insurance company, an image of a car accident may have attributes of accident date, accident location, etc. Another category of metadata includes system attributes, which are defined or generated by a content management system. For example, the create date of an image, an identifier of a user who ingested the image, where the image is stored, image size, etc.

Data migration is commonly used to implement Hierarchical Storage Management (HSM) for archive purposes.

Before performing migration or archiving, some readiness checking is done to each of the candidate content objects that may be migrated based on some system defined attributes for data consistency. The checking for the candidate content object may include, but is not limited to: determining whether the candidate content object is currently in the middle of a transaction, whether the candidate content object is still in retention or whether the candidate content object has a hold by a business application. This checking happens during the migration or archiving, which occupies the migration or archiving time window, and results in less time for moving content objects.

In most business systems, content migration is scheduled to happen during off-hours, for example, during nights. When data volume is big enough, migrating all the content objects in several hours is a challenge. In some business systems, there is a requirement that the migration finishes in a small time window.

Because the migration happens in off-hours, there may be no human interference, and there may be no way to get to know how many content objects are to be migrated. There is also no chance for administrators to review the migration candidate content objects before the migration.

SUMMARY

Provided is a method for movement readiness checking. The method comprises determining whether each content object in a set of content objects is ready for movement; for each content object in the set of content objects that is determined to be ready for movement, setting an associated movement readiness indicator to indicate that the content object is ready to be moved; and moving each content object in the set of content objects that has the associated movement readiness indicator set to indicate that the content object is ready to be moved.

Provided is a computer program product movement readiness checking. The computer program product comprises a computer readable storage medium having program code embodied therewith, the program code executable by at least one processor to perform: determining whether each content object in a set of content objects is ready for movement; for each content object in the set of content objects that is determined to be ready for movement, setting an associated movement readiness indicator to indicate that the content object is ready to be moved; and moving each content object in the set of content objects that has the associated movement readiness indicator set to indicate that the content object is ready to be moved.

Provided is a computer system movement readiness checking. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: determining whether each content object in a set of content objects is ready for movement; for each content object in the set of content objects that is determined to be ready for movement, setting an associated movement readiness indicator to indicate that the content object is ready to be moved; and moving each content object in the set of content objects that has the associated movement readiness indicator set to indicate that the content object is ready to be moved.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
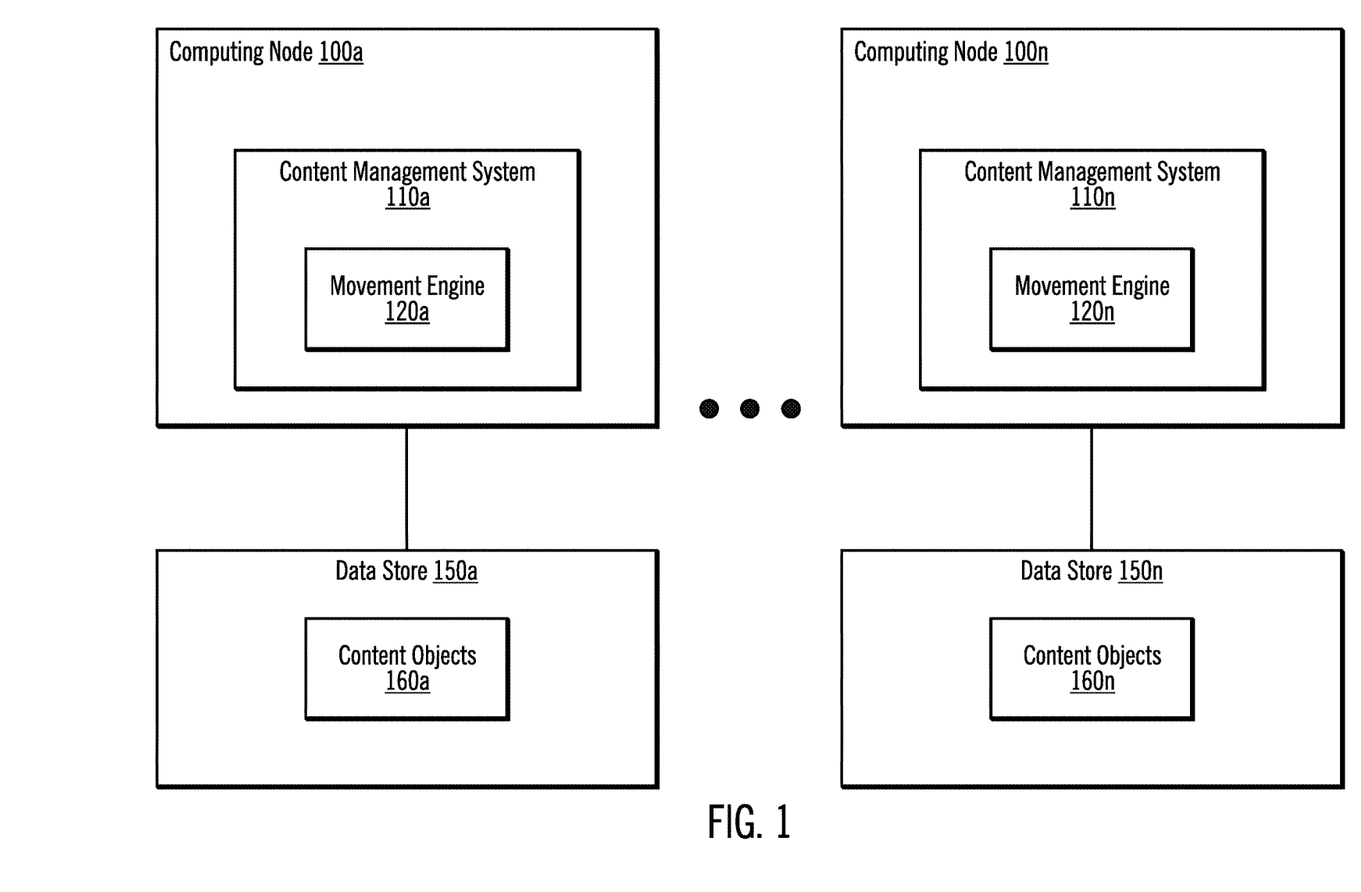
FIG. 1 illustrates, in a block diagram, a computing environment in accordance with certain embodiments.

FIG. 1 illustrates, in a block diagram, a computing environment in accordance with certain embodiments. In FIG. 1 nodes 100a ... 100n are depicted. The ellipses in FIG. 1 indicate that there may be any number of nodes. In certain embodiments, the nodes 100a ... 100n are each on different computer systems. In certain embodiments, the nodes 100a ... 100n are on a same computer system. In yet other embodiments, the nodes 100a ... 100n are on a small set of computer systems (fewer than the number of nodes).

Each of the nodes 100a ... 100n includes a content management system 110a ... 110n and is coupled to a data store 150a ... 150n. Each content management system 110a ... 110n includes a movement engine 120a ... 120n that is used for migration, archival, and/or deletion of content objects 160a ... 160n that are stored in the data store 150a ... 150n.

With embodiments, one of the content management systems 110a ... 110n is a central content management system, and the content objects 160a ... 160n are moved (migrated or archived) to this central content management system.

Movement may be controlled by movement policies (e.g., migration policies, deletion policies, and archival policies). Such movement policies may be defined before movement occurs. In certain embodiments, when content objects are created in the content management system, the life cycle is definite. For example, the content object is to be stored on hard disk for 30 days and then archived to the central content management system. Unlike with convention systems, with embodiments, users are able to change the life cycle of the content object based on the metadata of the content object. The metadata may include information related to the real business. For example, embodiments employ readiness rules to decide whether an object is ready to be migrated/archived. The readiness rules may be defined to check one or more attributes that are business related.

Figure 2:
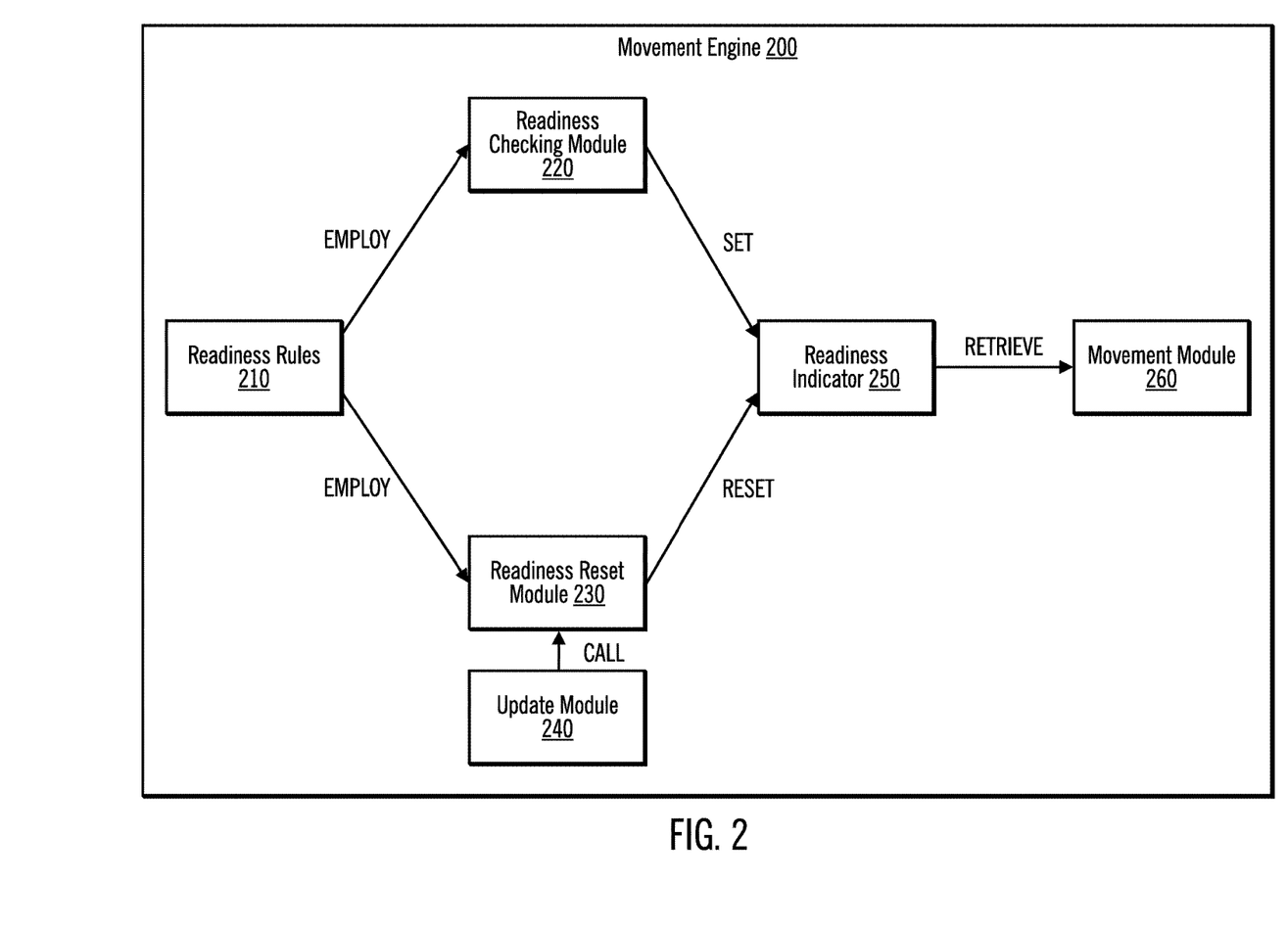
FIG. 2 illustrates further details of a movement engine in accordance with certain embodiments.

FIG. 2 illustrates further details of a movement engine in accordance with certain embodiments. Movement engines 120a ... 120n may take the form of movement engine 200. Movement engine 200 includes readiness rules 210, a readiness checker 220, a readiness reset module 230, an update module 240, a movement readiness indicator 250 (e.g., a flag), and a movement module 260.

The readiness checking module 220 checks the readiness of a content object for movement before performing the movement (e.g., before migration, deletion or archiving). In particular, the readiness checking module 220 uses the readiness rules 210 to determine the readiness of the content object. If the content object passes the checking, the readiness checking module 220 sets the movement readiness indicator 250 for the content object to indicate that the content object is ready to be moved. In certain embodiments, setting the flag results in setting the flag to a first value (e.g., "1" or "true") and resetting the flag results in setting the flag to a second value (e.g., "0" or "false").

Then, when doing migration, deletion or archiving, the movement module 260 checks the movement readiness indicator 250 of the content object to determine whether to do move the content object. In addition, an update to the content object or to the corresponding metadata of the content object will result in the update module 240 calling the readiness reset module 230. The readiness reset module 230 will reset the movement readiness indicator 250.

With embodiments, running the readiness checking module 220 results in content objects having their movement readiness indicator set if those content objects are ready to be moved. Then, a user (e.g., a system administrator) may query the content objects whose movement readiness indicators indicate that they may be moved, and these content objects may be referred to as candidate content objects. With embodiments, a report may be created that identifies the content objects that passed the readiness checking (e.g., whose movement readiness indicators indicate that they may be moved) and the content objects that did not pass the readiness checking (e.g., whose movement readiness indicators indicate that they are not ready to be moved). Then, the user may take actions to address any issues regarding the content objects that did not pass the readiness checking.

In certain embodiment, there is a central content management system, and different types of content objects are moved into this central content management system each night. With such embodiments, the content objects may be from different nodes, and a user may assign different movement time windows to different nodes for movement of content objects to avoid resource (e.g., network traffic, central content management system, etc.) conflicts. With embodiments, because the user may query how many content objects are to be moved for each node, the user may set the movement time window for each node more accurately (e.g., as short as possible) to save time for other nodes. A movement time window may be described as a specified period of time for completing a movement process to move content objects.

Thus, with embodiments, the readiness checking is done outside of the movement window time. That is, the readiness checking is done before the beginning of the movement window time. This allows the movement window time to be spent moving content objects, rather than performing readiness checking.

Embodiments leverage the fact that before content object movement (migration, deletion or archiving), the content object and corresponding metadata are not likely to be updated. Therefore, embodiments do some preparation work before the movement begins. Once the preparation work is done, the movement readiness indicator 250 is set if the content object is ready to be moved. Once the movement process begins, the movement module 260 checks this movement readiness indicator 250, instead of performing the readiness checking during the movement process. This saves the content object movement (migration, deletion or archiving) running time and shortens the time window required to complete the movement process.

The readiness checking module 220 may employ the readiness rules 210 for what should be checked for each of the content objects. With embodiments, if a specific content object passes the readiness checking, the movement readiness indicator 250 is set in a metadata row of the content object. With embodiments, the readiness checking module 220 may be implemented as a service or as a standalone application. Being a service, the readiness checking module 220 may be scheduled to run periodically. Being an application, the readiness checking module 220 may be run manually by a user based on, for example, a business requirement. Furthermore, the readiness checking module may be scheduled to run before the scheduled time window of the movement module 260 as a preparation operation of the movement module 260.

The readiness rules 210 define the rules to follow when doing the readiness checking. The readiness rules 210 may be complex or simple. If a readiness rule 210 is simple and may not change from time to time, it is possible to be built in the readiness checker module 220. In certain embodiments, such a readiness rule is optional. If a readiness rule 210 is complex or simple, the readiness rule 210 may be built and stored on a permanent store (e.g., in a database or file system). The readiness rules 210 may be loaded into memory by the readiness checking module 220 at runtime. The readiness rules 210 may be changed from time to time based on, for example, business requirements. In certain embodiments, the readiness rules 210 include checking one or more business flags or attributes, determining whether the candidate content object is currently in the middle of a transaction, whether the candidate content object is still in retention, whether the candidate content object is put on hold by a business application, etc.

The movement readiness indicator 250 is used to indicate whether a specific content object is ready for movement (content migration, deletion or archiving). This movement readiness indicator 250 is set by the readiness checker module 220 and reset by the readiness reset module 230.

The movement module 260 is used for the actual movement (migration, deletion or archiving) of the content objects. When the movement module 260 runs, the movement module 260 first checks the movement readiness indicator 250 of a content object to determine whether the content object is ready for movement. If the movement readiness indicator 250 indicates that the content object is ready for movement, the movement module 260 does the migration, deletion or archiving directly without doing further checking. With embodiments, the movement module may be implemented as a service or as a standalone application.

The readiness reset module 230 resets the movement readiness indicator 250 for a content object when some event occurs (e.g., the content object or the content metadata of the content object is updated (e.g., the content object is put on hold or there is some other update to a status of the content object), etc.). The implementation of the readiness reset module 230 module varies in different embodiments. For example, the readiness reset module 230 may be a trigger in a database, may be specific logic in an Application Programming Interface (API) layer, or may be built in a business application. Optionally, the readiness rules 210 may be taken as a reference of whether to reset the movement readiness indicator.

The update module 240 is a process that updates the content object and/or metadata of the content object. In certain embodiments, the update module 240 is part of a business application or a module that the business application may call. With embodiments, the update module 240 calls the readiness reset module 230 to check whether there is a need to reset the movement readiness indicator 250.

Embodiments enable checking and shortening the migration/deletion/archival time window. With embodiments, there is a way to get to know how many content objects are to be migrated. There is also a chance for administrators to review the migration/deletion/archival candidate content objects before the movement.

Figure 3:
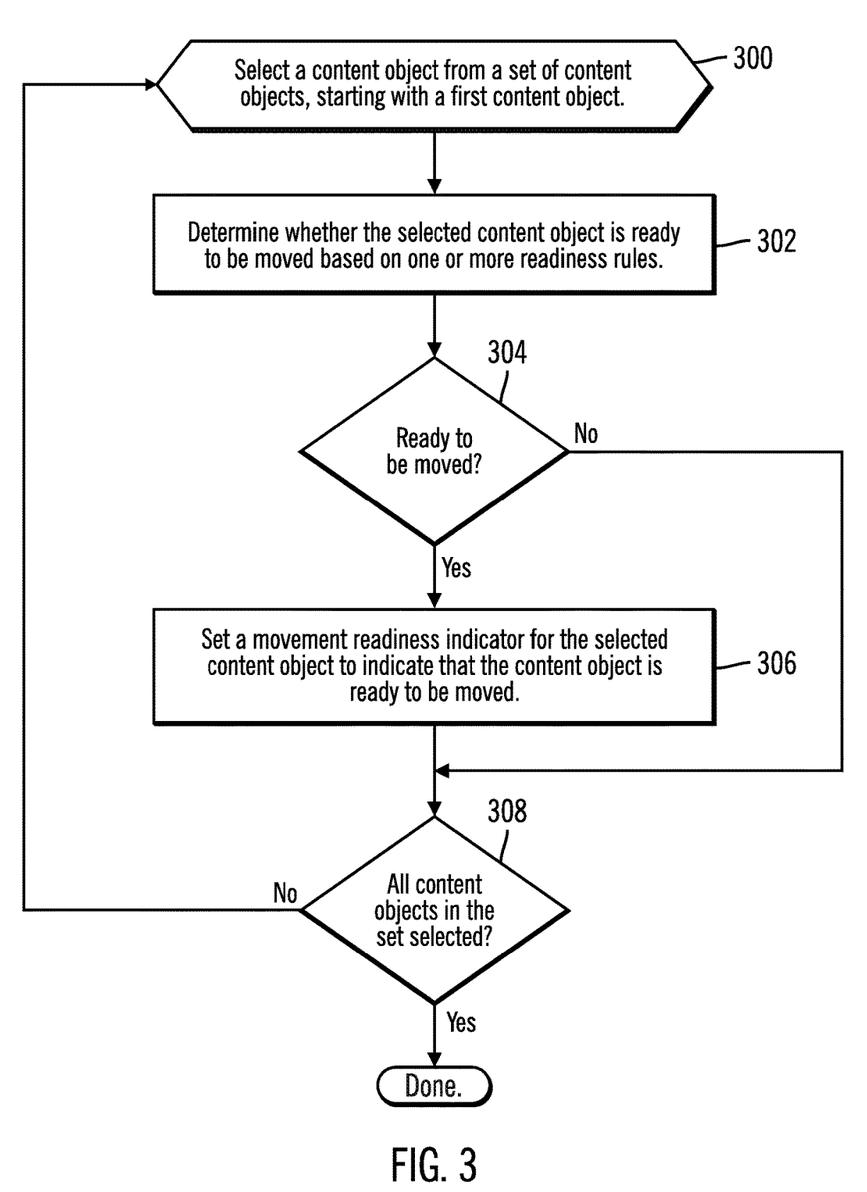
FIG. 3 illustrates, in a flow chart, operations performed by a readiness checking module in accordance with certain embodiments.

FIG. 3 illustrates, in a flow chart, operations performed by a readiness checking module 220 in accordance with certain embodiments. In certain embodiments, the readiness checking module 220 at each movement engine 120a . . . 120n of each node 100a . . . 100n performs these operations.

Control begins at block 300 with the readiness checking module 220 selecting a content object from a set of content objects, starting with a first content object. In block 302, the readiness checking module 220 determines whether the selected content object is ready to be moved based on one or more readiness rules. In block 304, the readiness checking module 220 determines whether the selected content object is ready to be moved. If so, processing continues to block 306, otherwise processing continues to block 308. In block 306, the readiness checking module 220 sets a movement readiness indicator for the selected content object to indicate that the content object is ready to be moved. In block 308, the readiness checking module 220 determines whether all content objects in the set of content objects have been selected for processing. If so, processing is done, otherwise, processing continues to block 300 to select another content object.

Figure 4:
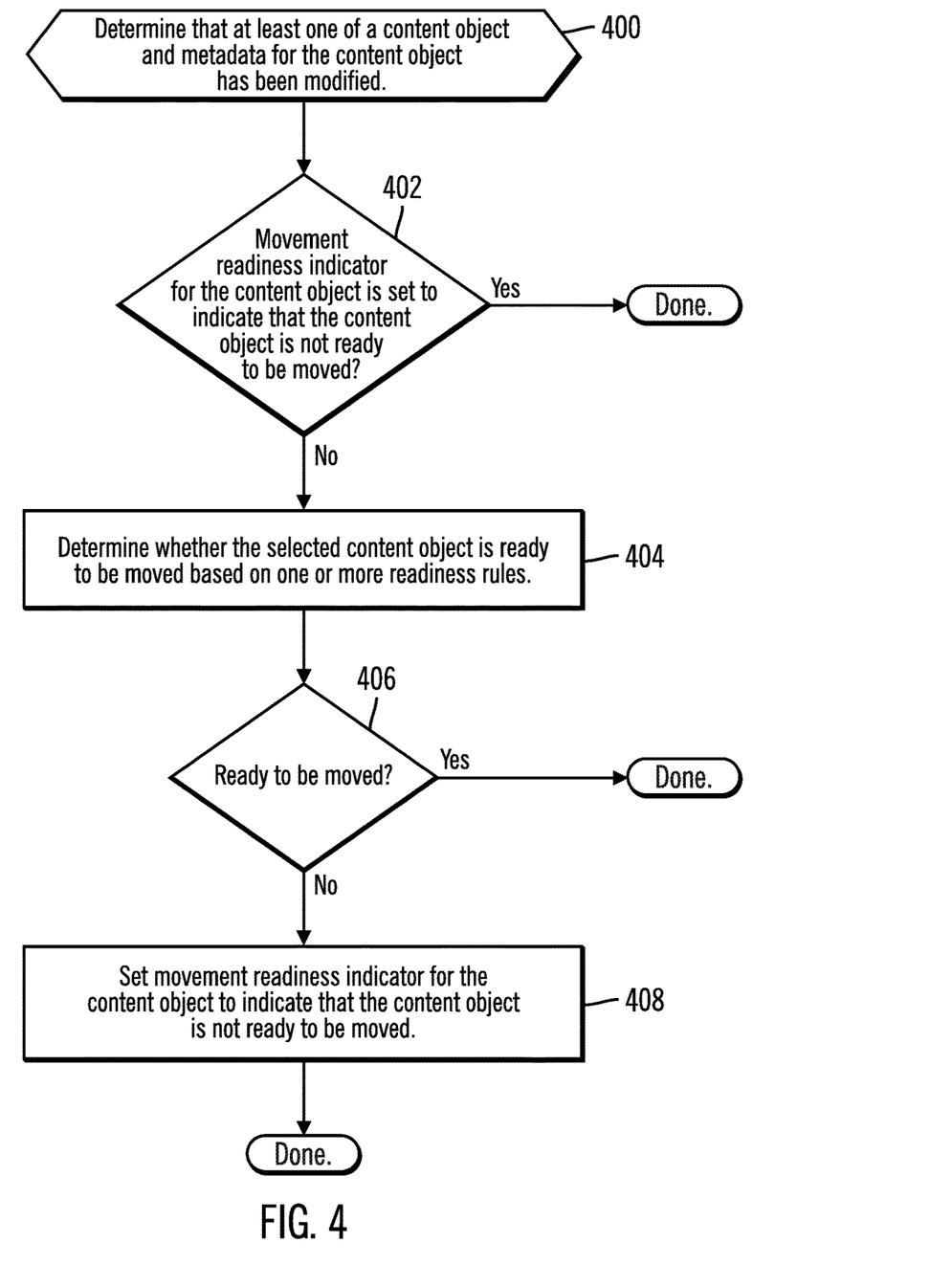
FIG. 4 illustrates, in a flow chart, operations performed by a readiness reset module in accordance with certain embodiments.

FIG. 4 illustrates, in a flow chart, operations performed by a readiness reset module in accordance with certain embodiments. Control begins at block 400 with the readiness reset module 230 determining that at least one of a content object and metadata for the content object has been modified. In block 402, the readiness reset module 230 determines whether a movement readiness indicator for the content object is set to indicate that the content object is not ready to be moved. If so, processing is done, otherwise, processing continues to block 404. In block 404, the readiness reset module 230 determines whether the selected content object is ready to be moved based on one or more readiness rules. In block 406, the readiness reset module 230 determines whether the content object is ready to be moved. If so, processing continues to block 408, otherwise, processing is done. In block 408, the readiness reset module 230 sets the movement readiness indicator for the content object to indicate that the content object is not ready to be moved, and processing is done for this content object.

Figure 5:
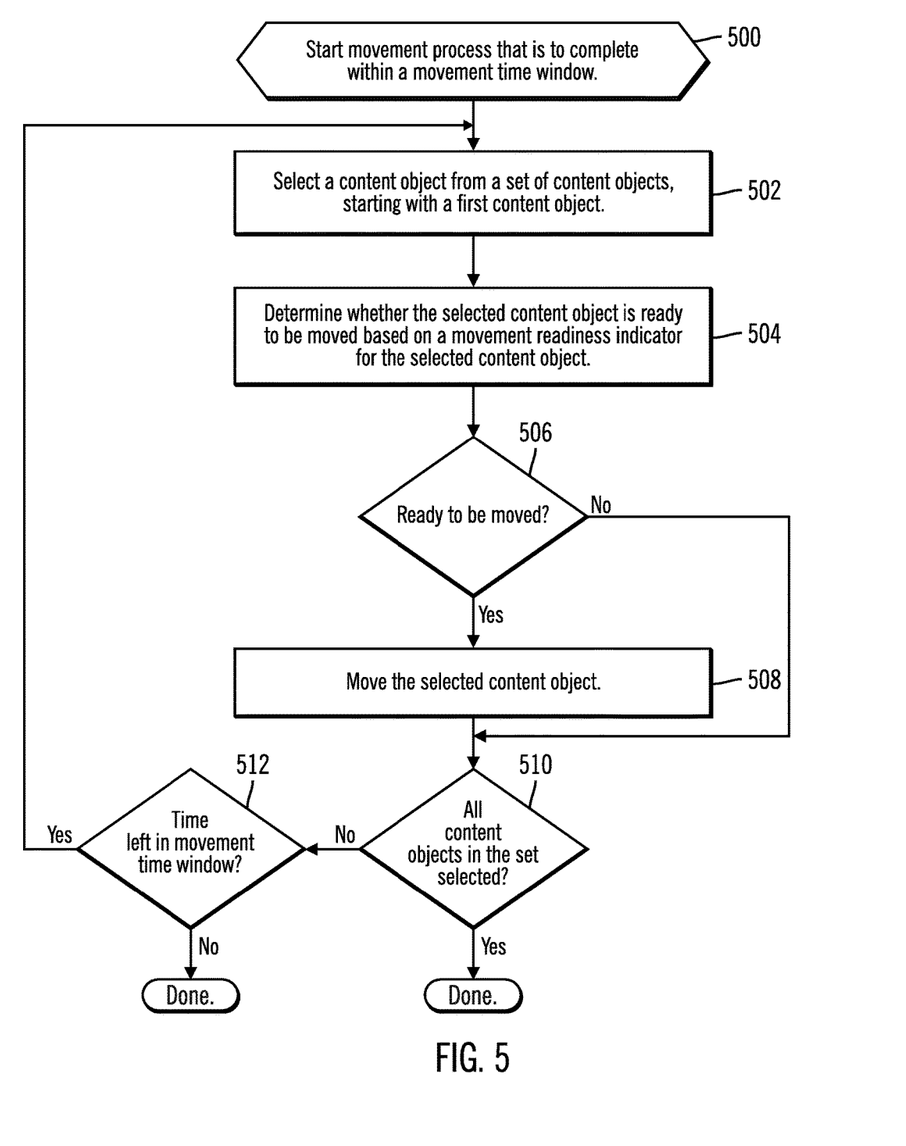
FIG. 5 illustrates, in a flow chart, operations performed by a movement module in accordance with certain embodiments.

FIG. 5 illustrates, in a flow chart, operations performed by a movement module 260 in accordance with certain embodiments. Control begins at block 500 with the movement module 260 starting a movement process that is to complete within a movement time window. In block 502, the movement module 260 selects a content object from a set of content objects, starting with a first content object. In block 504, the movement module 260 determines whether the selected content object is ready to be moved based on a movement readiness indicator for the selected content object. In block 506, the movement module 260 determines whether the selected content object is ready to be moved. If so, processing continues to block 508, otherwise processing continues to block 510. In block 508, the movement module 260 moves the selected content object. In block 510, the movement module 260 determines whether all content objects in the set of content objects have been selected for processing. If so, processing is done, otherwise, processing continues to block 512. In block 512, the movement module 260 determines whether there is time left in the movement time window. If so, processing continues to block 502 to select another content object, otherwise, processing is done.

Figure 6:
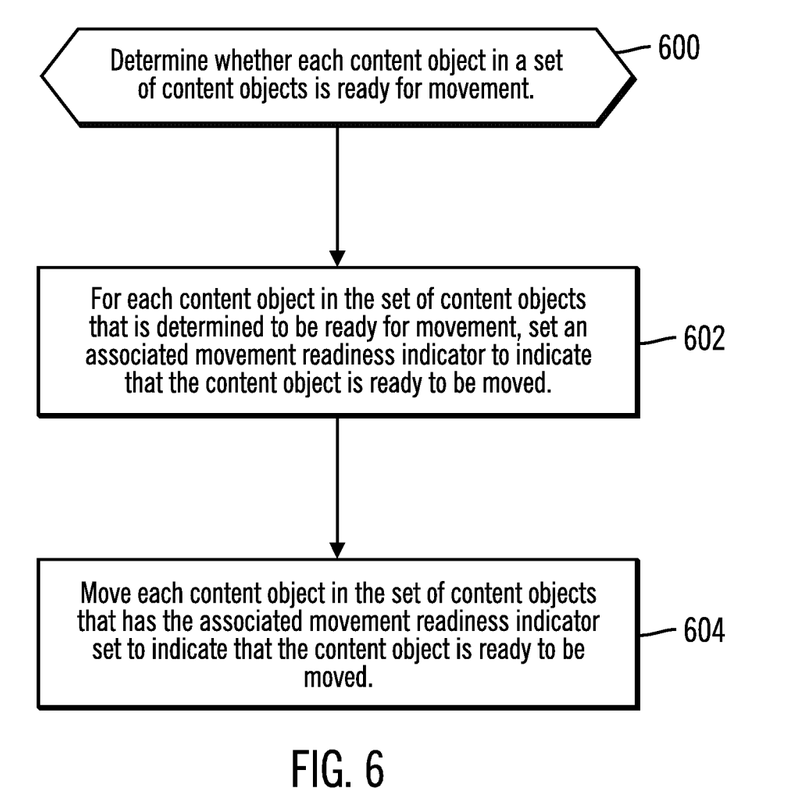
FIG. 6 illustrates, in a flow chart, operations performed by an interaction of modules in accordance with certain embodiments.

FIG. 6 illustrates, in a flow chart, operations performed by an interaction of modules in accordance with certain embodiments. Control begins at block 600 with the readiness checking module 220 determining. Whether each content object in a set of content objects is ready for movement. In block 602, the readiness checking module 220, for each content object in the set of content objects that is determined to be ready for movement, sets an associated movement readiness indicator to indicate that the content object is ready to be moved. In block 604, the movement module 260 moves each content object in the set of content objects that has the associated movement readiness indicator set to indicate that the content object is ready to be moved.

Figure 7:
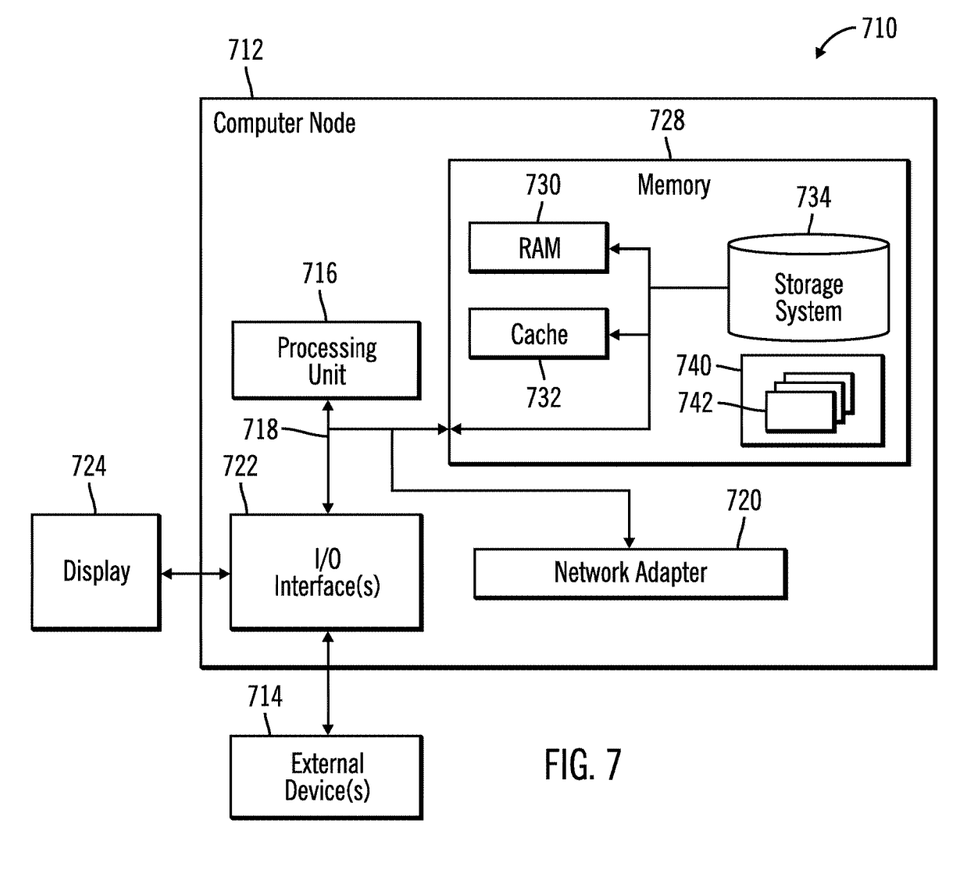
FIG. 7 illustrates a computing node in accordance with certain embodiments.

Referring now to FIG. 7, a schematic of an example of a computing node is shown. Computing node 710 is only one example of a suitable computing node and is not intended to suggest any limitation as to the scope of use or functionality of embodiments of the invention described herein. Regardless, computing node 710 is capable of being implemented and/or performing any of the functionality set forth hereinabove.

In computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

In certain embodiments, each computing node 100a . . . 100n has the architecture of computing node 710. In certain embodiments, each computing node 100a . . . 100n is part of a cloud environment. In certain alternative embodiments, each computing node 100a . . . 100n 400 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
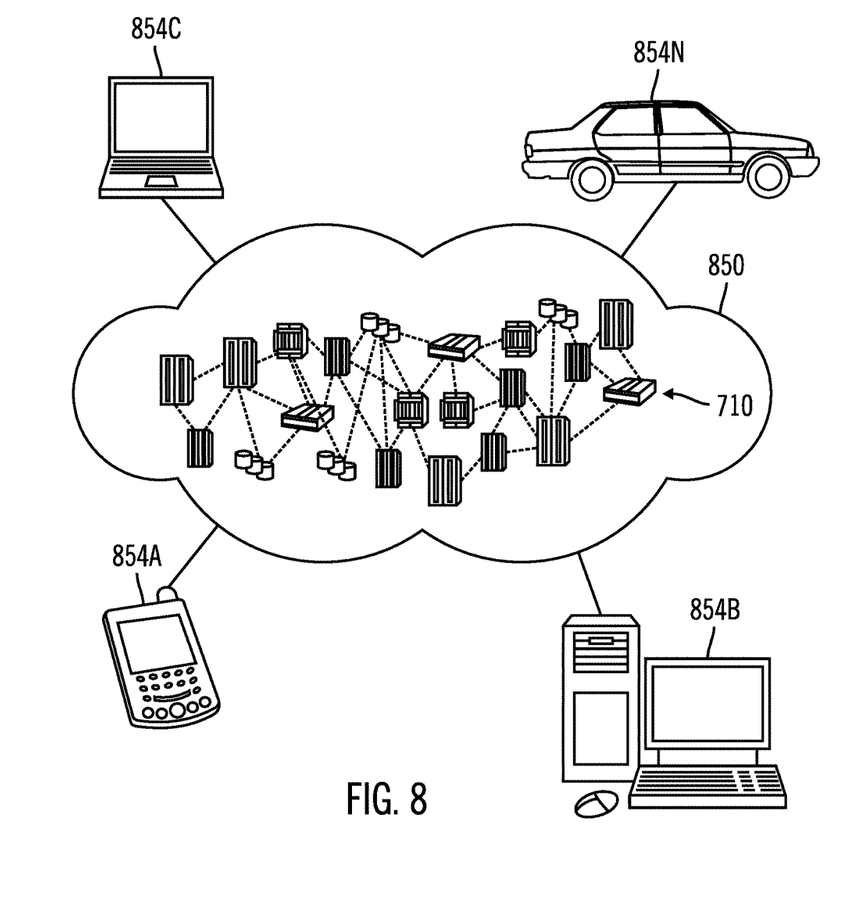
FIG. 8 illustrates a cloud computing environment in accordance with certain embodiments.

Referring now to FIG. 8, illustrative cloud computing environment 850 is depicted. As shown, cloud computing environment 850 comprises one or more computing nodes 710 with which local computing devices used by cloud consumers, such as, for example, personal digital assistant (PDA) or cellular telephone 854A, desktop computer 854B, laptop computer 854C, and/or automobile computer system 854N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 710 and cloud computing environment 850 can communicate with any type of computerized device over any type of network and/or network addressable connection (e.g., using a web browser).

Figure 9:
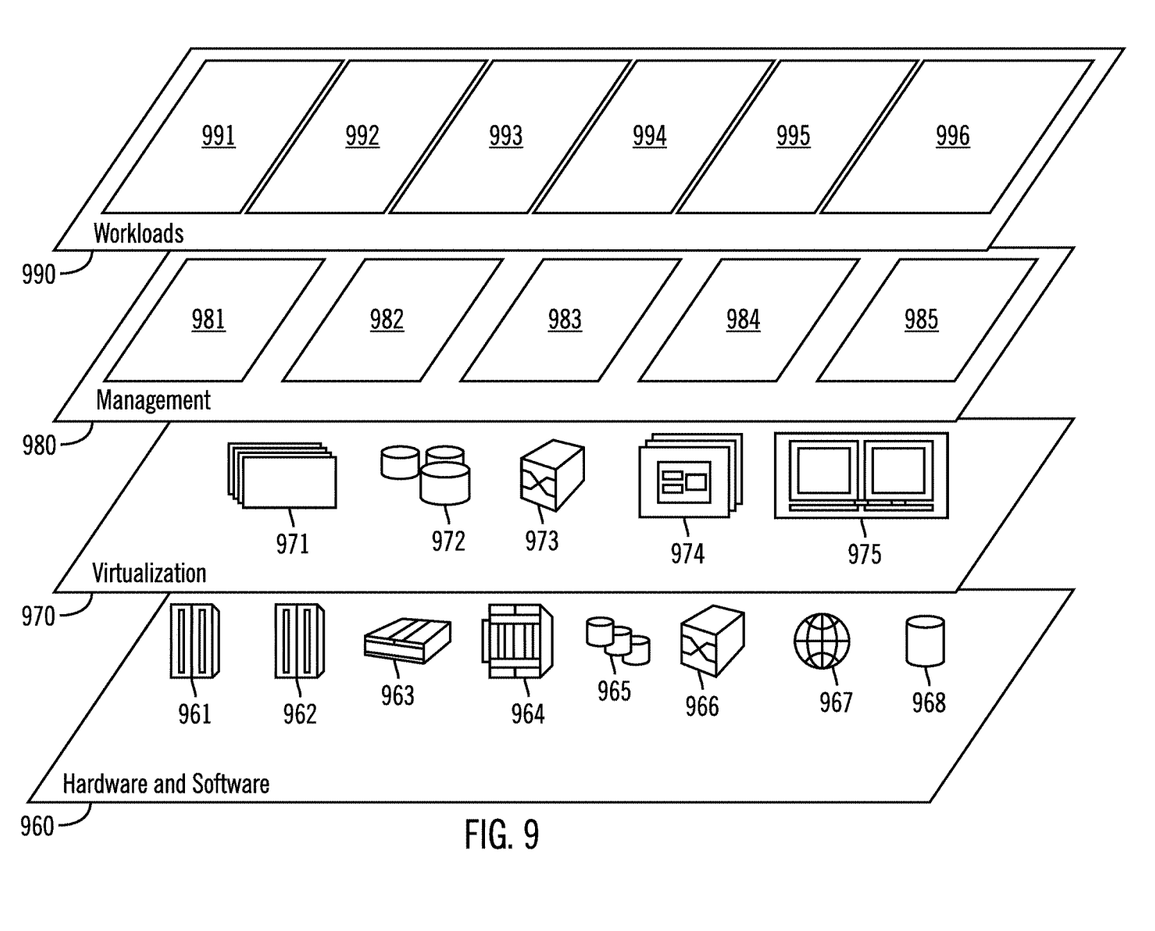
FIG. 9 illustrates abstraction model layers in accordance with certain embodiments.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and movement readiness checking 996.

Thus, in certain embodiments, software or a program, implementing movement readiness checking in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
determining, outside a movement time window, whether each content object in a set of content objects is ready for movement by checking whether each content object is on hold, wherein any content object that is on hold is not to be any of migrated, deleted, and archived;
for each content object in the set of content objects that is not on hold, setting, outside the movement time window, an associated indicator to indicate that the content object is ready for movement;
for each content object in the set of content objects that is on hold, resetting, outside the movement time window, the associated indicator to indicate that the content object is not ready for movement; and
moving, within the movement time window, each content object in the set of content objects that has the associated indicator set to indicate that the content object is ready for movement, wherein the movement time window is set to a period of time that allows completing movement of each content object in the set of content objects that has the associated indicator set.

2. The method of claim 1, further comprising:
in response to at least one of an update to the content object in the set of content objects and an update to metadata for the content object, resetting the associated indicator to indicate that the content object is not ready to be moved.

3. The method of claim 1, wherein each content object is further determined to be ready for movement based on whether the content object is currently involved in a transaction.

4. The method of claim 1, wherein a Software as a Service (SaaS) is configured to perform method operations.

5. A computer program product, the computer program product comprising a computer readable storage medium having program code embodied therewith, the program code executable by at least one processor to perform:
determining, outside a movement time window, whether each content object in a set of content objects is ready for movement by checking whether each content object is on hold, wherein any content object that is on hold is not to be any of migrated, deleted, and archived;
for each content object in the set of content objects that is not on hold, setting outside the movement time window, an associated indicator to indicate that the content object is ready for movement;
for each content object in the set of content objects that is on hold, resetting outside the movement time window, the associated indicator to indicate that the content object is not ready for movement; and
moving, within the movement time window, each content object in the set of content objects that has the associated indicator set to indicate that the content object is ready for movement, wherein the movement time window is set to a period of time that allows completing movement of each content object in the set of content objects that has the associated indicator set.

6. The computer program product of claim 5, wherein the program code is executable by the at least one processor to perform:
in response to at least one of an update to the content object in the set of content objects and an update to metadata for the content object, resetting the associated indicator to indicate that the content object is not ready to be moved.

7. The computer program product of claim 5, wherein each content object is further determined to be ready for movement based on whether the content object is currently involved in a transaction.

8. The computer program product of claim 5, wherein a Software as a Service (SaaS) is configured to perform computer program product operations.

9. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform:
determining, outside a movement time window, whether each content object in a set of content objects is ready for movement by checking whether each content object is on hold, wherein any content object that is on hold is not to be any of migrated, deleted, and archived;
for each content object in the set of content objects that is not on hold, setting outside the movement time window, an associated indicator to indicate that the content object is ready for movement;
for each content object in the set of content objects that is on hold, resetting outside the movement time window, the associated indicator to indicate that the content object is not ready for movement; and
moving, within the movement time window, each content object in the set of content objects that has the associated indicator set to indicate that the content object is ready for movement, wherein the movement time window is set to a period of time that allows completing movement of each content object in the set of content objects that has the associated indicator set.

10. The computer system of claim 9, wherein operations further comprise:
in response to at least one of an update to the content object in the set of content objects and an update to metadata for the content object, resetting the associated indicator to indicate that the content object is not ready to be moved.

11. The computer system of claim 9, wherein each content object is further determined to be ready for movement based on whether the content object is currently involved in a transaction.

12. The computer system of claim 9, wherein a Software as a Service (SaaS) is configured to perform system operations.

* * * * *